Dec. 3, 1929.  C. BROADWICK  1,737,913
PARACHUTE
Filed Nov. 5, 1928
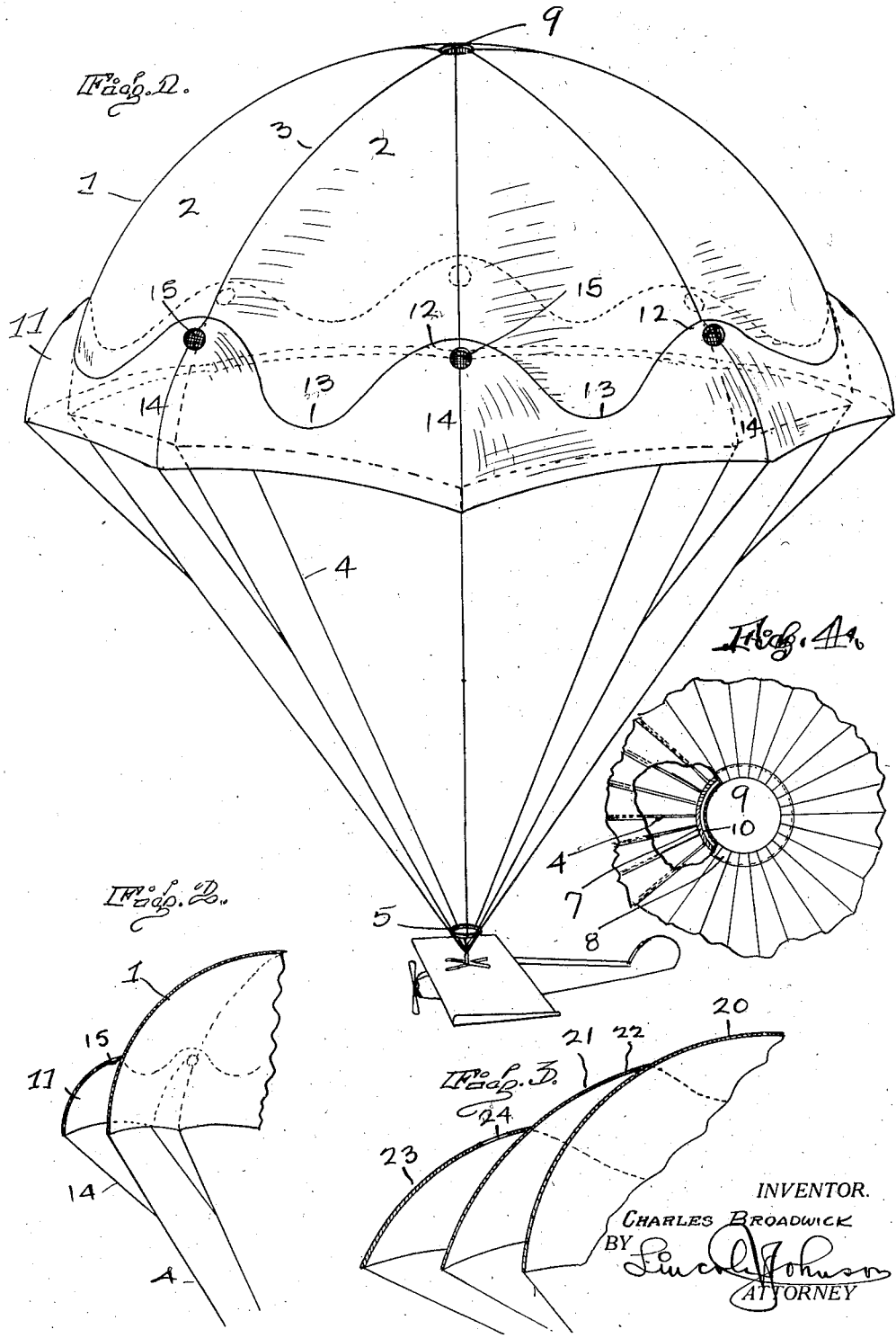
INVENTOR.
CHARLES BROADWICK
BY
ATTORNEY Patented Dec. 3, 1929

1,737,913

UNITED STATES PATENT OFFICE

CHARLES BROADWICK, OF SAN FRANCISCO, CALIFORNIA

PARACHUTE

Application filed November 5, 1928. Serial No. 317,143.

This invention relates particularly to parachutes for transporting humans, airplanes, and other objects through the air at a slow rate of speed to the ground.

An object of the invention is to provide a parachute which may or may not be provided with a vent in the head thereof, which is adapted to open and contract in accordance with the varying air pressures below the parachute, and which also is provided with a skirt around the outside of the edge of the parachute, and which also may or may not be provided with vents therein adapted to open and contract in accordance with the varying air pressures below the parachute, whereby the vents in both the parachute and skirt will open when encountering a sudden impact or pressure of air below the parachute, to resiliently absorb the same and after the pressure has been relieved, the vents will contract, thereby avoiding tearing of the material out of which the parachute and skirt are formed.

A further object of the invention is to provide a parachute with a skirt around the circumference of the outside thereof capable of assisting in the support of any load carried by the parachute, whereby a parachute of a relatively small size provided with a skirt thereon, will safely carry to the ground, at a slower speed and without swinging or oscillating movement, a greater load than that which might be carried by a parachute of the same size not equipped with a skirt.

Other objects of the invention are to provide a load carrying parachute that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying one sheet of drawings:

Fig. 1 represents a perspective view of a parachute constructed in accordance with my invention and having a scalloped skirt around the outside thereof.

Fig. 2 is a fragmentary cross section taken through the skirt and parachute shown in Fig. 1.

Fig. 3 is a fragmentary cross section through a modified form of parachute having a plurality of skirts sewed around the outside thereof.

Fig. 4 is a plan view of a portion of the parachute around the vent.

In detail the construction illustrated in the drawings comprises a concavo-convex sheet 1, preferably formed of silk, and made of a series of tapered segments or panels 2, united together along their meeting edges in seams 3. The edges of the segments are united in seams 3 and these seams are formed so as to loosely include the supporting lines 4 which extend from the carriage structure 5 upwardly to the lower edge of the parachute where they are attached to the material of the sheet, thence through the seams to the head of the parachute where they are formed in a loop 7 which lies in the hemmed edge 8 forming a vent 9 through the head or center of the parachute. The vent 9 consists of a circular hole through the center or head of the parachute, held in a contracted position by a rubber cord 10 enclosed in the hem 8, which allows the vent to open and contract in accordance with the varying air pressures below the parachute. The size of the vent when contracted and when expanded, will vary with the size of the parachute. When the parachute is in flight, the force of the air below the parachute or whatever air pressure the parachute encounters as it drops, causes the vent in the head of the parachute to automatically open and contract to relieve excessive air pressure to prevent damage or tearing of the parachute, and to allow the parachute to drop at a uniform rate of speed. The vent also causes the parachute to drop in a relatively straight path, and eliminates any oscillating or swinging movement of the parachute.

I have provided a silk skirt 11 sewed continuously about the outside of the sheet 1 near the free edge thereof, said skirt being formed of segments or panels of the same material out of which the parachute is formed, and sewed to the parachute so that the seams of the skirt are in substantial alignment with the seams of the parachute. The skirt is sewed to the parachute a substantial distance above the free edge of the sheet 1 whereby when the parachute is in flight, the skirt with fill with air and belly outward to provide additional surface to the air and consequently to increase the carrying capacity of the parachute. The skirt 11 where it joins to the sheet 1 is cut in scallops 12 and 13, so that the higher portions 12 of each scallop will lie over a seam on the skirt 1, and the lower portions 13 of each scallop will lie between the seams on the parachute. The idea of forming the edge of the skirt where it attaches to the parachute, in scallops, is that it provides relatively large pockets 14 in the skirt between the skirt and the seam of the parachute, and a relatively small space between the skirt and the center of each panel or segment, of which the parachute is formed, between the seams thereof. Each of the pockets 14 formed in the skirt 11 are provided with an expansible vent 15 near to the place where the said skirt is secured to the parachute and each vent is provided with an expansible elastic band therearound, to open and contract in accordance with the varying air pressures confined between the parachute and the skirt. As the parachute descends, the air pressure between the pockets in the skirt is directed into the said pockets, due to the scalloped manner in which the skirt is formed, whereby the air is directed from the lower parts 13 of the scallops to the higher parts 12 thereof, and the expansible vents in the skirt automatically adjust themselves to the stresses of the air. Because of the skirt on the outside of the parachute and the scalloped manner in which it is formed, it is found that for a given diameter of the open parachute with a skirt thereon, a greater weight may be carried, and a landing made at a slower speed.

In the modified form of the invention shown in Fig. 3, I have provided a parachute 20 having a skirt 21 sewed around the entire circumference thereof, said skirt 21 having expansible vents 22 therein, to open and contract in accordance with varying air pressures confined between the outside of the parachute and the inside of the skirt. A secondary skirt 23 is attached to the outside of the primary skirt and the inside of the secondary skirt. The primary and secondary skirts are arranged on the outside of the parachute 20, whereby the edges of said skirts lie substantially flush with the edge of the parachute. The primary and secondary skirts thus provide additional surface outside of the main parachute within which air can be confined and used for supporting the parachute while in the air and slowing the rate of speed at which the parachute will drop. The vents 22 and 24 in the skirts of the parachute also function to eliminate any swinging or oscillating movement of the parachute.

Having thus described this invention, what I claim and desire to secure by Letters Patent is:

1. A parachute comprising a concavo-convex sheet; supporting lines attached to the edge of said sheet in spaced relation therearound; a skirt around the outside of the lower edge of the said sheet, said skirt being cut in scollops and having the scolloped edge thereof secured to the outside of the said sheet to provide pockets of varying sizes between the skirt and the outside of the parachute; and supporting lines secured to the free edge of the skirt and to the first mentioned supporting lines.

2. A parachute comprising a concavo-convex sheet; supporting lines attached to the edge of said sheet in spaced relation therearound; a skirt around the outside of the lower edge of the said sheet, said skirt being cut in scollops and having the scolloped edge thereof secured to the outside of the said sheet to provide pockets of varying sizes between the skirt and the outside of the parachute, said skirt also having a plurality of vents therein in registry with the pockets, which are adapted to open and contract in accordance with the varying air pressures below the parachute; and supporting lines secured to the free edge of the skirt and to the first mentioned supporting lines.

3. A parachute comprising a concavo-convex sheet formed with a vent which is adapted to open and contract in accordance with the varying air pressures below the parachute; supporting lines attached to the edge of said sheet in spaced relation therearound; a skirt around the outside of the lower edge of the said sheet, said skirt being cut in scollops and having the scolloped edge thereof secured to the outside of the said sheet to provide pockets of varying sizes between the skirt and the outside of the parachute; and supporting lines secured to the free edge of the skirt and to the first mentioned supporting lines.

4. A parachute comprising a concavo-convex sheet formed with a vent which is adapted to open and contract in accordance with the varying air pressures below the parachute; supporting lines attached to the edge of said sheet in spaced relation therearound; a skirt around the outside of the lower edge of the said sheet, said skirt being cut in scollops and having the scolloped edge thereof secured to the outside of the said sheet to provide pockets of varying sizes between the skirt and the outside of the parachute, said skirt also having a plurality of vents therein in registry with the pockets, which are adapted to open and contract in accordance with the varying air pressures below the parachute; and supporting lines secured to the free edge of the skirt and to the first mentioned supporting lines.

5. A parachute comprising a concavo-convex sheet; a primary skirt attached to the outside of the said sheet, the edges of the skirt and sheet being substantially flush with each other; a secondary skirt mounted around the outside of the primary skirt and having its lower edge substantially flush with the edges of the primary skirt and the parachute; and carrying lines attached to the lower edge of the parachute and the primary and secondary skirts.

6. A parachute comprising a concavo-convex sheet; a primary skirt attached to the outside of the said sheet, the edges of the skirt and sheet being substantially flush with each other; a secondary skirt mounted around the outside of the primary skirt and having its lower edge substantially flush with the edges of the primary skirt and the parachute; a plurality of vents in the primary skirt and in the secondary skirt which are adapted to open and contract in accordance with the varying air pressures below the parachute and skirts; and carrying lines attached to the lower edge of the parachute and the primary and secondary skirts.

In testimony whereof, I have hereunto set my hand at San Francisco, California, this 11th day of October, 1928.

CHARLES BROADWICK.